United States Patent Office 3,652,559
Patented Mar. 28, 1972

---

3,652,559
DIAMINOCYCLOALKANES
Jacob Szmuszkovicz, Kalamazoo, Mich., assignor to The Upjohn Company, Kalamazoo, Mich.
No Drawing. Continuation-in-part of application Ser. No. 638,611, May 15, 1967. This application May 13, 1968, Ser. No. 728,779
Int. Cl. C07d 87/38
U.S. Cl. 260—247.5 R
33 Claims

ABSTRACT OF THE DISCLOSURE

Cis- and trans-diaminocycloalkanes, acid addition and quaternary ammonium salts thereof. The novel compounds are useful as tertiary amines and catalysts. In addition, many of the 1,2- and 1,3-diaminocycloalkanes exhibit activity as central nervous system stimulants, diuretics, anorexigenic and antidiabetic agents.

CROSS REFERENCE TO RELATED APPLICATIONS

This is a continuation-in-part application of Ser. No. 638,611, filed May 15, 1967, now issued as U.S. Pat. No. 3,527,756.

BRIEF SUMMARY OF THE INVENTION

The novel compounds of this invention, which includes both the cis- and trans-isomers, have the formulae

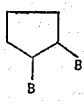 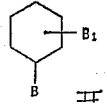 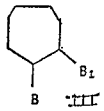

wherein B and $B_1$ may be the same or different saturated heterocyclic amino groups selected from the class consisting of unsubstituted and mono- and polyalkyl substituted piperidino, morpholino, homomorpholino, thiamorpholino, piperazino, pyrrolidino, hexamethyleneimino, heptamethyleneimino, and octamethyleneimino, and wherein the alkyl radicals on the substituted amino groups contain from 1 to 4 carbon atoms, inclusive.

Representative mono- and polyalkyl substituted saturated heterocyclic amino groups are 2-methylhexamethyleneimino,
2,2-dibutylhexamethyleneimino,
3,6-dimethylhexamethyleneimino,
2-ethylmorpholino,
2-ethyl-5-methylmorpholino,
3,3-dimethylmorpholino,
3-methylthiamorpholino,
2,3,4,5-tetramethylthiamorpholino,
2,3,6-trimethylthiamorpholino,
4-butylpiperazino,
4-isopropylpiperazino,
2,2,4,5,5-pentamethylpiperazino,
2-methylpiperidino,
3-methylpiperidino,
4-isopropylpiperidino,
3,4-diethylpiperidino,
2-sec.butylpiperidino,
2,2-dimethylpyrrolidino,
2-ethylpyrrolidino,
3,4-dimethylpyrrolidino,
2-isopropylpyrrolidino and the like.

The term "novel compounds of this invention" as used throughout the specification embraces the compounds represented by the Formulae I, II, and III above, and the acid addition and quaternary ammonium salts thereof.

The novel compounds can be prepared by several processes which will be explained in detail below.

DETAILED DESCRIPTION

Some of the various methods of preparing diaminocycloalkanes are illustrated by the following equations.

FROM TRANS-N-(2-CHLOROCYCLOALKYL)SATURATED HETEROCYCLIC AMINES (A)

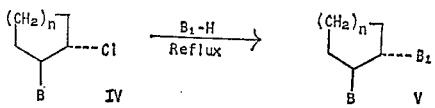

wherein B and $B_1$ are the same as above and $n$ is an integer from 1 to 3, inclusive.

In reaction (A), a trans-N-(2-chlorocycloalkyl)saturated heterocyclic amine (IV) is reacted with the appropriate saturated heterocyclic amine ($B_1$-H) under reflux conditions. The reaction proceeds smoothly when the molar ratio of the amine to chlorocycloalkyl amine is about 2:1. However, this ratio may vary from 2:1 to 6:1.

The starting N-(2-chlorocycloalkyl)heterocyclic amine (IV) can be prepared according to the following reaction scheme.

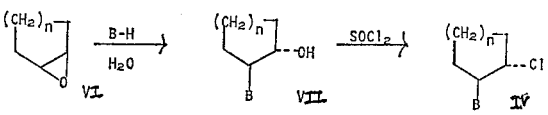

wherein B and $n$ are the same as above.

In the first step of the reaction scheme, a cycloalkene oxide (VI) is heated with the appropriate saturated heterocyclic amine in the presence of water to form a trans-secondary aminocycloalkanol (VII). Although the reaction will proceed under anhydrous conditions, the yield is increased considerably when it is conducted in the presence of water. The reaction can be conducted at temperatures of about 50° to 150° C. and pressures of about 1 to 3 atmospheres.

In the second step of the reaction scheme, the saturated trans-secondaryamino-cycloalkanol (VII) is reacted with thionyl chloride in the presence of an inert solvent, e.g., benzene, toluene or the like, and at a temperature below 15° C., followed by heating the reaction mixture for about 3 to 4 hours at temperatures of about 75° to 115° C., to yield the trans-N-(2 - chlorocycloalkyl)saturated heterocyclic amine (IV). This product can be recovered by the use of conventional recovery procedures such as extraction, crystallization, distillation, and combinations thereof. The reaction conditions used in the various steps of the process illustrated in this reaction scheme are discussed in detail by Jilek et al., Chem. Listy 43, 56–8 (1949) [abstracted in Chemical Abstracts 45, 576, (1951)].

The cyclalkene oxides used as the starting material in this process are readily available from commercial sources, or they may be readily prepared by the reaction of cycloalkenes with peracids.

Reaction (A) may be utilized to prepare the Formula V trans-1,2 - diaminocyclopentanes, trans-1,2 - diaminocyclohexanes, and trans-1,2-diaminocycloheptanes.

REACTION OF A TRANS-N-(2-AMINOCYCLOALKYL)SATURATED HETEROCYCLIC AMINE WITH DIHALOALKANES (B)

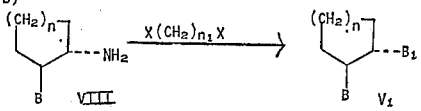

wherein B and $n$ are the same as above, $n_1$ is 4 or 5, B' is selected from the group consisting of pyrrolidino and piperidino, and X is halogen.

In this reaction, a trans-N-(2 - aminocycloalkyl)saturated heterocyclic amine (VIII) is reacted with a diiodoalkane or dibromoalkane under reflux conditions in the presence of potassium carbonate to yield the trans-1,2-diaminocycloalkane ($V_1$). Best results are obtained when the amine and dihaloalkene are reacted in a 1:1 molar ratio. The amount of potassium carbonate used should be two molar equivalents per molar equivalent of amine. The trans-1,2 - diaminocycloalkane is recovered from the reaction mixture by conventional procedures such as evaporation, extraction, and distillation.

The starting amine (VIII) is prepared by reacting the corresponding 1,2-iminocycloalkane with the appropriate saturated heterocyclic amine reflux conditions. The preferred molar ratio of amine to imine is 2:1; however, this ratio can vary from 1:1 to 10:1.

The imine utilized to prepare the starting amine can be prepared in accordance with the synthesis described by Swift et al., J. Org. Chem. 32,511 (1967).

Reaction (B) can be used to prepare Formula $V_1$ trans-1,2-diaminocyclopentanes, trans - 1,2-diaminocyclohexanes, and trans-1,2-diaminocycloheptanes wherein the amino group B' is pyrrolidino or piperidino.

PREPARATION FROM ENAMINES (C)

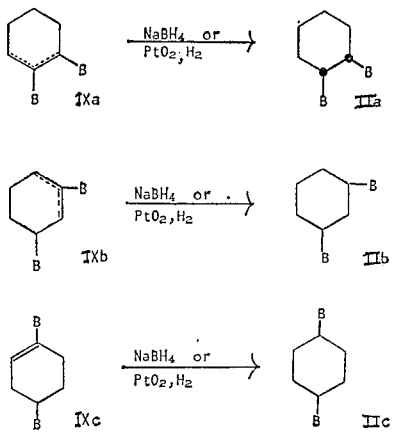

wherein B is the same as above.

The sodium borohydride reduction is effectuated by reacting the enamine (IXa, IXb or IXc) with sodium borohydride in the presence of an inert solvent. The molar ratio of enamine to sodium borohydride can vary from about 1:1 to 1:10. The reaction occurs readily at temperatures of about 25° to 80° C. Suitable inert solvents are alkanols, such as methanol, ethanol, isopropanol, and ethylene glycol dimethyl ether. The Formulas IIa, IIb, and IIc diaminocycloalkanes can be recovered from the reaction mixture by conventional recovery procedures such as evaporation, extraction, and distillation.

The catalytic hydrogenation is carried out by contacting a solution of the enamine with molecular hydrogen in the presence of a noble metal catalyst and a solvent at temperatures of about 25° to 100° C. and pressures of about 1 to 30 atmospheres. Suitable solvents are methanol, ethanol, dioxane and the like. Suitable catalysts are any of the noble metals such as platinum, palladium, etc. Conventional separation procedures such as evaporation, distillation, and extraction can be used to recover the diaminocycloalkane from the reaction mixture.

The 1,2-enamine (IXa) can be prepared by reacting a 2-halocyclohexanone with a saturated heterocyclic amine under reflux conditions. Preferably, the molar ratio of amine to ketone is 4:1, but the ratio can be varied from 2:1 to 8:1. The 1,4-enamines (IXc) can be prepared from the corresponding 4-tosyloxycyclohexanone, which can in turn be prepared in accordance with reaction scheme (D) set forth below. The 1,3-enamine (IXb) can be prepared by reacting 2-cyclohexen-1-one with the appropriate heterocyclic amine.

The cis-1,2-diaminocyclopentanes and the 1,2-diaminocycloheptanes of the formulae

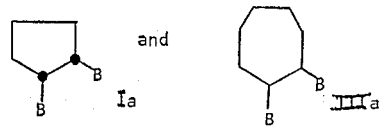

where B is the same as above can be prepared by reducing (with sodium borohydride or by catalytic hydrogenation as described above) the corresponding 1,2-enamines, which in turn can be prepared by substituting a 2-halocyclopentanone or a 2-halocycloheptanone for the above 2-halocyclohexanone.

When reaction scheme (C) is utilized to prepare 1,2-diaminocyclopentanes (Ia) and 1,2-diaminocyclohexanes (IIa) only the cis-isomers are obtained. However, when this scheme is utilized to prepare 1,3-diaminocyclohexanes (IIb), 1,4-diaminocyclohexanes (IIc) and 1,2-diaminocycloheptanes (IIIa) mixtures of cis- and trans-isomers are obtained.

PREPARATION FROM (DITOSYLOXY)CYCLOHEXANES
(D)

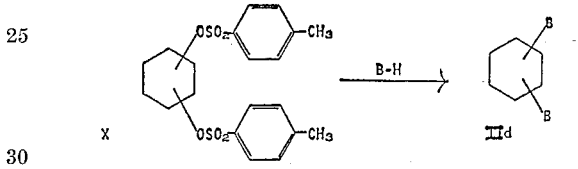

wherein B is the same as above.

In reaction (D), a di(tosyloxy)cyclohexane is stirred with a saturated heterocyclic amine in the presence of a nitrogen atomsphere. The preferred molar ratio of di(tosyloxy)cyclohexane to amine is about 1:10; however, this ratio can vary from about 2:1 to 20:1. The reaction is conducted at temperatures of about 80° to 150° C. and a nitrogen pressure of 1 to 3 atmospheres. Conventional separation procedures such as distillation, evaporation, and extraction can be utilized to separate the diaminocyclohexanes (IId) from the reaction mixture.

The starting di(tosyloxy)cyclohexane (X) is prepared by (1) reacting the appropriate cyclohexanediol with p-toluensulfonyl chloride in the presence of a solvent such as pyridine, triethylamine, or the like, to form a mixture of the tosyloxycyclohexanol and di(tosyloxy)cyclohexane and (2) oxidizing the formed mixture to yield a mixture of tosyloxycyclohexanone and di(tosyloxy)cyclohexane. These reactions are described by Nelson et al., J. Org. Chem. 22, 1146–1153 (1957).

As pointed out in the discussion of reaction scheme (C) the 4-tosyloxycyclohexanone is a starting material for the 1,4-enamines (IXc) used in reaction scheme (C). The reaction may be illustrated as follows:

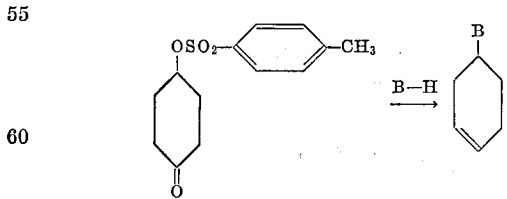

wherein B is the same as above.

In this reaction the 4-tosyloxycyclohexanone is reacted with a heteorcyclic amine under a nitrogen atmosphere and at temperatures of about 80° to 100° C. A molar ratio of 4-tosyloxycyclohexanone to amine of about 1:5 is preferred; however, it can vary from 1:3 to 1:10.

The process isIlustrated by reaction scheme (D) may be utilized to prepare both the cis- and trans-isomers of the diaminocyclohexanes (IId) of this invention. Whether the cis- or trans-isomers will be obtained will depend upon whether the cis- or trans-di(tosyloxy)cyclohexane is utilized as a starting material.

PREPARATION FROM DI-ENAMINE (E)

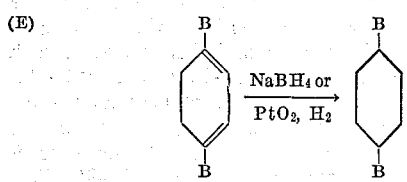

wherein B is the same as above.

In this reaction the di-enamine is reduced to the corresponding 1,4-diaminocyclohexane by subjecting it to either sodium borohydride reduction or catalytic hydrogenation in accordance with the procedures described in the discussion of reaction (C).

Both methods of reduction yield mixtures of cis- and trans-isomers. However, sodium borohydride reduction appears to favor the formation of trans-isomers whereas catalytic hydrogenation appears to favor formation of cis-isomers. The isomers can be separated by conventional means, e.g., by crystallization from a solvent or by vapor phase chromatography.

The di-enamines used as starting materials in this reaction can be prepared by reacting 1,4-cyclohexanedione with the appropriate heterocyclic amine in accordance with the procedure of Leonard et al., J. Org. Chem. 21, 1187–1188 (1956).

The acid addition salts of the invention comprise the salts of the free bases of Formulae I, II, and III above with pharmacologically acceptable acids such as sulfuric, hydrochloric, hydrobromic, hydroiodic, nitric, phosphoric, lactic, benzoic, methanesulfonic, p-toluenesulfonic, acetic, propionic, salicylic, maleic, malic, tartaric, citric, cyclohexanesulfamic, succinic, nicotinic, ascorbic, fumaric, heptanoic, palmitic, naphthalene-1-sulfonic, naphthalene-2-sulfonic, naphthalene - 1,5 - disulfonic, ethanedisulfonic, cyclopentylpropionic, glucoheptonic, camphorsulfonic, pamoic, p-acetamidobenzoic and like acids.

The quaternary ammonium salts of the invention are the salts obtained by reacting the compounds of Formulae I, II, and III with quaternizing agents, for example, alkyl halides, alkenyl halides, dialkyl sulfates, aralkyl halides, alkyl arylsulfonates, and the like. The term "alkyl" means alkyl containing from 1 to 4 carbon atoms, inclusive. The term "alkenyl" means alkenyl containing from 3 to 8 carbon atoms, inclusive, such as allyl, 2-butenyl, 2-pentenyl, 2-hexenyl, 2-heptenyl, 2-octenyl, and isomeric forms thereof. The term "aralkyl" means an aralkyl group containing from 7 to 13 carbon atoms, inclusive, such as benzyl, α-phenethyl, α-phenylpropyl, benzhydryl and the like. The term "alkyl arylsulfonates" means the esters formed from alkyl alcohols and arylsulfonic acids such as benzenesulfonic, toluenesulfonic, xylenesulfonic, and the like acids. Examples of quaternary salts of the compounds of the invention are methobromide, methiodide, ethobromide, propyl chloride, butyl bromide, octyl bromide, methyl methosulfate, ethyl ethosulfate, allyl chloride, allyl bromide, benzyl bromide, benzhydryl chloride, methyl toluenesulfonate, ethyl toluenesulfonate and the like.

The novel 1,2- and 1,3-diaminocycloalkanes of this invention possess pharmacological activity. Thus, they are capable of exerting substantial effects on the central nervous system of animals. Illustratively cis-1,1'-(1,2-cyclohexylene)dipyrolidine dihydrochloride monohydrate, cis - 1,1'-(1,2-cyclohexylene)dipiperidine dihydrobromide methanol solvate, trans-1,1'-(1,2-cyclohexylene)dipiperidine dihydrobromide methanol solvate, cis-1-[2-(1-pyrrolidinyl)cyclohexyl]piperidine dihydrobromide methanol solvate, cis-1,1'-(1,2-cyclopentylene)dipiperidine dihydrobromide and 1,1'-(1,3-cyclohexylene)dipiperidine act as stimulants when administered intraperitoneally to Carworth Farm male mice in dosages of 3 to 50 mg./kg.

Many of the 1,2-diaminocycloalkanes of this invention also exhibit antidiabetic activity in animals. Illustratively, when administered orally to rats at a dosage of 100 mg./kg., trans-1,1'-(1,2-cyclohexylene)dipiperidine dihydrobromide methanol solvate, cis-1,1'-(1,2-cyclohexylene)dipyrrolidine dihydrochloride monohydrate, the mono- and dihydrobromide methanol solvates of cis-4-[2-(1-pyrrolidinyl)cyclohexyl]morpholine, cis-1-[2-(1 - pyrrolidinyl)cyclohexyl]piperidine dihydrobromide methanol solvate, cis - 1,1' - (1,2-cyclopentylene)dipyrrolidine dihydrobromide hemihydrate and 1-methyl-4-(2-piperidinocyclohexyl)piperazine oxalate (1:2) hemihydrate lowered the blood sugar level.

The novel 1,2-diaminocycloalkanes also exhibit anorexigenic activity in animals. For example, cis-4-[2-(1-pyrrolidinyl)cyclohexyl]morpholine hydrobromide methanol solvate and trans - 1,1' - (1,2-cyclohexylene)dipiperidine dihydrobromide methanol solvate decreased the food intake of mice when administered orally in dosages of 1 to 10 mg./kg.

Many of the novel 1,2-diaminocycloalkanes are useful as diuretics. Illustratively, cis- and trans-1,1'-(1,2-cyclohexylene)dipiperidine dihydrobromide methanol solvates, the mono- and dihydrobromide methanol solvates of cis-4-2 - (1-pyrrolidinyl)cyclohexyl]morpholine, cis-1,1'-(1,2-cyclopentylene)dipiperidine dihydrobromide, cis-1-[2-(1-pyrrolidinyl)cyclohexyl]piperidine dihydrobromide methanol solvate, and 1-methyl-4-(2-piperidinocyclohexyl)piperazine oxalate (1:2) hemihydrate are excellent diuretics when administered orally to Upjohn-Sprague Dawley rats weighing 180–200 g. in 200 mg./kg. dosages. Also, trans - 1,1' - (1,2-cyclohexylene)dipiperidine dihydrobromide methanol solvate and cis-1-[2-(1-pyrrolidinyl)cyclohexyl]piperidine dihydrobromide methanol solvate exhibit diuretic activity in dosages as low as 5 mg./kg.

For purposes of administration to birds and to mammals, including animals of economic value such as horses, cattle, sheep, pigs, mice, rats, rabbits and the like, the novel compounds of the invention can be combined with solid or liquid pharmaceutical carriers and formulated in the form of tablets, powder packets, capsules, and like solid dosage forms, using starch and like excipients, or dissolved or suspended in suitable solvents or vehicles, for oral or parenteral administration.

The free bases of the invention are tertiary nitrogen bases and as such are useful substitutes for basic tertiary amines such as pyridine and triethylamine. The free bases can be used as buffers or as antacids. The thiocyanic acid addition salts when condensed with formaldehyde form resinous materials useful as inhibitors according to U.S. Pats. 2,425,320 and 2,606,155 in the acid pickling of steel. The free bases also make good vehicles for toxic acids. For example, the fluosilicic acid addition salts are useful as mothproofing agents according to U.S. Pats. 1,915,334 and 2,075,359, and the hexafluoroarsenic acid and hexafluorophosphoric acid addition salts are useful as parasiticides according to U.S. Pats. 3,122,536 and 3,122,552.

The free bases are also useful as catalysts for reactions between isocyanates and active hydrogen compounds; e.g., alcohols and amines, and are especially useful as catalysts for the formation of polyurethanes, e.g., polyurethane foams, by interaction of polyisocyanates and polyhydroxy compounds.

Some of the intermediates utilized to prepare the novel compounds of Formulae I, II, and III also exhibit pharmacodynamic activity in animals. Illustratively, the novel intermediates trans-2-(1-pyrrolidinyl)cyclohexanol hydrochloride and trans-1-(2-aminocyclohexyl)pyrrolidine have central nervous system antinicotinic activity when administered intraperitoneally to mice.

Also, some of the by-products formed in reaction scheme (D) exhibit pharmacological activity. Illustratively, the novel 1-(3-cyclohexen-1-yl)piperidine hydrochloride is useful as a diuretic when administered orally to rats in dosage levels as low as 5 mg./kg.

The following examples are set forth to illustrate my invention and to enable persons skilled in the art to better understand and practice the invention and are not intended to limit the same.

In Examples 1 through 4, the method for preparing the novel compounds of this invention in accordance with reaction scheme (A) is illustrated. In Example 5, method (B) is illustrated. Examples 6 through 15 illustrate method (C); Examples 16 and 17 method (D), and Example 18 method (E).

A method for preparing quaternary salts of the novel compounds is illustrated in Example 19, and Examples 20 and 21 illustrate methods for preparing starting materials for method (D).

EXAMPLE 1

*Trans-1,1'-(1,2-cyclohexylene)dipiperidine and dihydrobromide methanol solvate thereof*

A mixture of 42.1 g. (0.209 mole) of trans-1-(2-chlorocyclohexyl)piperidine and 35.6 g. (0.418 mole) of piperidine is refluxed for 46 hours. The resulting suspension is filtered, and the filtrate is acidified with concentrated hydrochloric acid, cooled and basified with 40% aqueous potassium hydroxide solution. The resulting mixture is shaken with four 100-ml. portions of ether and the combined ether extract is washed with saturated salt solution, dried over magnesium sulfate and evaporated. Distillation of the residue at 0.1 mm. Hg pressure gives 17.5 g. (33% yield) of trans-1,1'-(1,2-cyclohexylene)dipiperidine in the form of an oil, B.P. 100–102° C.

*Analysis.*—Calcd. for $C_{16}H_{30}N_2$ (percent): C, 76.74; H, 12.08; N, 11.19. Found (percent): C, 76.73; H, 12.05; N, 11.48.

The free base (about 17 g.) is converted to its dihydrobromide methanol solvate by dissolving it in ether and then treating the ethereal solution with a 30% solution of hydrogen bromide in acetic acid. The solids are separated from the solution by filtration and then recrystallized from methanol to afford 24.8 g. of trans-1,1'-(1,2-cyclohexylene)dipiperidine dihydrobromide methanol solvate, M.P. 284–286° C., in the form of colorless prisms.

*Analysis.*—Calcd. for $C_{16}H_{30}N_2 \cdot 2HBr \cdot CH_3OH$ (percent): C, 45.95; H, 8.17; Br, 35.97; N, 6.31. Found (percent): C, 45.56; H, 7.67; Br, 35.49; N, 6.09.

Other trans-1,2-diaminocycloalkanes are obtained by replacing trans-1-(2-chlorocyclohexyl)piperidine and/or piperidine with the appropriate trans-N-(2-chlorocycloalkyl)saturated heterocyclic amine and/or saturated heterocyclic amine. Representative of the trans-1,2-diaminocycloalkanes prepared are:

trans-1,1'-(1,2-cycloheptylene)dipiperidine,
trans-1,1'-(1,2-cycloheptylene)di-(3-methylpiperidine),
trans-1,1'-(1,2-cyclohexylene)di-(4-methylpiperidine),
trans-1,1'-(1,2-cyclohexylene)di-(4-ethylpiperidine),
trans-1,1'-(1,2-cyclohexylene)di-(4-propylpiperidine),
trans-1,1'-(1,2-cyclopentylene)di-(2,6-dimethylpiperidine),
trans-4,4'-(1,2-cyclohexylene)dimorpholine,
trans-4,4'-(1,2-cyclohexylene)dithiamorpholine,
trans-1,1'-(1,2-cyclohexylene)dipiperazine,
trans-1,1'-(1,2-cyclohexylene)dihexamethyleneimine,
trans-1,1'-(1,2-cyclohexylene)diheptamethyleneimine,
trans-1,1'-(1,2-cyclohexylene)dioctamethyleneimine, and
trans-4,4'-(1,2-cyclohexylene)dihomomorpholine.

EXAMPLE 2

*Trans-1,1'-(1,2-cyclohexylene)dipyrrolidine and dihydrochloride methanol solvate thereof*

A solution consisting of 28.7 g. (0.153 mole) of trans-1-(2-chlorocyclohexyl)pyrrolidine and 21.8 g. (0.306 mole) of pyrrolidine is refluxed for 18 hours. The solution is cooled, mixed with 100 ml. of 18% hydrochloric acid, and then extracted with ether. After separating the layers, the acid layer is cooled, basified with 40% aqueous sodium hydroxide solution and then extracted with ether. The ether extract is washed with a saturated solution of sodium chloride, dried over magnesium sulfate, and then evaporated. Distillation of the residue at 0.2 mm. Hg pressure gives 7.3 g. of trans-1,1'-(1,2-cyclohexylene)dipyrrolidine in the form of an oil, B.P. 95–96° C.

*Analysis.*—Calcd. for $C_{14}H_{26}N_2$ (percent): C, 75.61; H, 11.79; N, 12.60. Found (percent): C, 75.05; H, 11.93; N, 12.43.

The free base is dissolved in ether and then treated with an ethereal solution of hydrogen chloride. The solids are separated from the solution by filtration and then recrystallized from methanol to afford crystals of trans-1,1'-(1,2-cyclohexylene)dipyrrolidine dihydrochloride methanol solvate, M.P. 285–287° C.

*Analysis.* — Calcd. for $C_{14}H_{26}N_2 \cdot 2HCl \cdot 0.5CH_3OH$ (percent): C, 55.94; H, 9.71; Cl, 22.78; N, 9.00. Found (percent): C, 56.12; H, 9.88; Cl, 22.54; N, 8.66.

EXAMPLE 3

*Trans-1-[2-(1-pyrrolidinyl)cyclohexyl]piperidine and dihydrochloride methanol solvate hemihydrate thereof*

A solution of 53.1 g. (0.284 mole) of trans-1-(2-chlorocyclohexyl)pyrrolidine and 48.3 g. (0.568 mole) of piperidine is refluxed for 24 hours. The resulting solution is cooled, mixed with 200 ml. of 10% hydrochloric acid, and then extracted with ether. The acid layer is separated from the mixture, cooled, basified with 40% aqueous sodium hydroxide solution and then extracted with three 100-ml. portions of ether. The combined ether extract is washed with a saturated solution of sodium chloride, dried over magnesium sulfate, and evaporated. Distillation of the residue at 0.2 mm. Hg pressure gives two fractions. The first (36.7 g. is the starting chloride and the second (11 g.) is trans-1-[2-(1-pyrrolidinyl)cyclohexyl]piperidine, B.P. 97–98° C.

*Analysis.*—Calcd. for $C_{15}H_{28}N_2$ (percent): C, 76.21; H, 11.94; N, 11.85. Found (percent): C, 76.00; H, 12.01; N, 11.82.

The trans-1-[2-(1-pyrrolidinyl)cyclohexyl]piperidine is dissolved in ether and then treated with an ethereal solution of hydrogen chloride. The solids are separated from the solution by filtration and recrystallized from methanol-ether to yield trans-1-[2-(1-pyrrolidinyl)cyclohexyl]piperidine dihydrochloride methanol solvate hemihydrate, M.P. 213–214.5° C.

*Analysis.*—Calcd. for $C_{15}H_{28}N_2 \cdot 2HCl \cdot CH_3OH \cdot 0.5H_2O$ (percent): C, 54.84; H, 10.07; N, 8.00. Found (percent): C, 54.43; H, 10.07; N, 8.12.

EXAMPLE 4

*Trans-4-[2-(1-pyrrolidinyl)cyclohexyl]morpholine and dihydrochloride methanol solvate thereof*

A solution consisting of 53.1 g. (0.284 mole) of trans-1-(2-chlorocyclohexyl)pyrrolidine and 49.5 g. (0.568 mole) of morpholine is refluxed for 22 hours. The resulting suspension is cooled in ice, treated with 200 ml. of 18% hydrochloric acid and extracted with ether. The acidic layer is separated from the ether layer, basified with 40% aqueous sodium hydroxide solution and then extracted with three 150-ml. portions of ether. The combined ether extract is washed with saturated sodium chloride solution, dried over magnesium sulfate and then evaporated. The residue is distilled twice at a pressure of 0.1 mm. of Hg to yield 4.7 g. of trans-4-[2-(1pyrrolidinyl)cyclohexyl]morpholine, B.P. 104–106° C.

The trans-4-[2-(1 - pyrrolidinyl)cyclohexyl]morpholine is dissolved in ether and then treated with an ethereal solution of hydrogen chloride. The solids are separated from the solution by filtration and then recrystallized from a methanol-ether mixture to yield trans - 4 - [2-

(1 - pyrrolidinyl)cyclohexyl]morpholine dihydrochloride methanol solvate, M.P. 240–242° C.

*Analysis.*—Calcd. for $C_{14}H_{26}N_2O \cdot 2HCl \cdot CH_3OH$ (percent): C, 52.47; H, 9.40; Cl, 20.65; N, 8.16. Found (percent): C, 52.09; H, 9.57; Cl, 21.29; N, 8.65.

EXAMPLE 5

*Trans-1,1'-(1,2-cyclohexylene)dipyrrolidine and dihydrochloride hemihydrate thereof*

(A) TRANS-1-(2-AMINOCYCLOHEXYL)PYRROLIDINE

A solution consisting of 18.5 g. (0.088 mole) of 1,2-iminocyclohexane and 31.2 g. (0.44 mole) of pyrrolidine is refluxed overnight. Distillation of the reaction mixture at a pressure of 14 mm. Hg gives 3 g. (20%) yield) of trans-1-(2-aminocyclohexyl)pyrrolidine in the form of an oil, B.P. 114–116° C.

Calcd. for $C_{10}H_{20}N_2$ (percent): N, 16.65. Found (percent): N, 16.96.

(B) TRANS-1,1'-(1,2-CYCLOHEXYLENE)DIPYRROLIDINE AND DIHYDROCHLORIDE HEMIHYDRATE THEREOF

A mixture consisting of 2.3 g. (0.0137 mole) of trans-1-(2-aminocyclohexyl)pyrrolidine, 3.8 g. (0.0274 mole) of potassium carbonate, 2.95 g. (0.0137 mole) of 1,4-dibromobutane and 30 ml. of ethanol is refluxed for 20 hours with stirring. The resulting mixture is cooled, filtered and evaporated. Water is added to the residue and the resulting mixture extracted with ether. The ether phase is separated from the aqueous phase, washed with saturated salt solution, dried over magnesium sulfate and evaporated. The residue is distilled under 0.1 mm. Hg pressure and a temperature of 110–115° C. to give 1.8 g. of an oil. The oil is evaporated and the residue recrystallized twice from petroleum ether (boiling range 30–70° C.) at −70° C. to yield crystalline trans-1,1'-(1,2-cyclohexylene)dipyrrolidine melting at 50–51° C.

*Analysis.*—Calcd. for $C_{14}H_{26}N_2$ (percent): C, 75.61; H, 11.79; N, 12.60. Found (percent): C, 76.69; H, 11.80; N, 12.64.

The free base is dissolved in ether and treated with an ethereal solution of hydrogen chloride. The solids are separated from the solution by filtration and then recrystallized from ethanol-ether to yield crystalline trans-1,1'-(1,2 - cyclohexylene)dipyrrolidine dihydrochloride hemihydrate, M.P. 284–285° C.

*Analysis.*—Calcd. for $C_{14}H_{26}N_2 \cdot 2HCl \cdot 0.5H_2O$ (percent): C, 55.25; H, 9.61; Cl, 23.30; N, 9.21. Found (percent): C, 55.08; H, 9.67; Cl, 23.83; N, 8.62.

EXAMPLE 6

*Cis-1,1'-(1,2-cyclohexylene)dipiperidine and dihydrobromide methanol solvate thereof*

(A) THE PIPERIDINE ENAMINE OF 2-PIPERIDINO-CYCLOHEXANONE

A mixture of 2-piperidinocyclohexanone (31.1 g.; 0.172 mole), piperidine (43.9 g.; 0.516 mole), p-toluenesulfonic acid monohydrate (2.4 g.) and 860 ml. of toluene is refluxed under nitrogen for 101 hours using an azeotropic separator; 1.8 ml. of an aqueous layer separates. The mixture is evaporated to dryness on the steam bath in vacuo, and the residue is distilled at 16 mm. Hg pressure using a 24″ Nester-Faust spinning band column to yield 14.2 g. of the pipiredine enamine of 2-piperidinocyclohexanone (yield 33%), B.P. 173–175° C.

Using the procedure set forth in part (A), but replacing 2-piperidinocyclohexanone by 3-piperidinocyclohexanone and 4-piperidinocyclohexanone, there are obtained the corresponding enamines.

Similarly, other enamines are obtained when the piperidinocyclohexanones are replaced by heterocyclicamino-substituted cycloheptanones and cyclopentanones.

(B) CIS-1,1'-(1,2-CYCLOHEXYLENE)DIPIPERIDINE AND DIHYDROBROMIDE METHANOL SOLVATE THEREOF (1) By catalytic hydrogenation: A solution of 7.0 g. (0.0282 mole) of the piperidine enamine of 2-piperidinocyclohexanone in 50 ml. of ethanol is hydrogenated in the presence of 1 g. of platinum oxide catalyst at an initial pressure of 53.5 lb. The hydrogenation stops after the absorption of about one mole hydrogen (approximately 1 hour). The reaction mixture is filtered and evaporated and the residue is distilled at 0.1 mm. Hg pressure to give 5.4 g. of cis - 1,1' - (1,2-cyclohexylene)dipiperidine, B.P. 130–135° C.

A solution of 5.3 g. (0.0212 mole) of the cis-1,1'-(1,2-cyclohexylene)dipiperidine in 100 ml. of ether is treated with 14.4 g. of a 30% hydrogen bromide-acetic acid solution, and then diluted with 100 ml. of ether. The resulting oily solid is decanted, washed with ether and crystallized from a mixture of 50 ml. each of ether and methanol to yield 6 g. of clusters of needles, M.P. 265° C. (dec.). Recrystallization from methanol yields cis-1,1'-(1,2-cyclohexylene)dipiperidine dihydrobromide methanol solvate, M.P. 267° C.

*Analysis.*—Calcd. for $C_{16}H_{30}N_2 \cdot 2Hbr \cdot 0.5CH_3OH$ (percent: C, 46.27; H, 7.82; Br, 38.77; N, 6.54. Found (percent): C, 45.96; H, 7.75; Br, 37.96; N, 7.03.

(2) By sodium borohydride reduction: Over a 5-minute period, 7 g. (0.0282 mole) of the piperidine enamine of 2-piperidinocyclohexanone is added to a suspension of 7 g. of sodium borohydride in 100 ml. of ethanol and the mixture is stirred overnight. The mixture is then evaporated to dryness and the residue is mixed with 50 ml. of water and 100 ml. of ether. After stirring for 30 minutes, the ether layer is separated from the mixture and stirred with 10% hydrochloric acid for about 30 minutes. The acid extract is cooled in ice, basified with 15% aqueous sodium hydroxide solution, and the mixture is extracted with ether. The ether extract is washed with saturated salt solution, dried over magnesium sulfate and then evaporated. Distillation of the residue at 14 mm. Hg pressure yields 5.1 g. of cis-1,1'-(1,2-cyclohexylene)dipiperidine as an oil, B.P. 160–170° C.

Using the procedure described in B(1) above, 4.8 g. of the obtained cis-1,1'-(1,2-cyclohexylene)dipiperidine is converted to 6 g. of cis-1,1'-(1,2-cyclohexylene)dipiperidine dihydrobromide methanol solvate, M.P. 266° C.

EXAMPLE 7

*Cis-1,1'-(1,2-cyclohexylene)dipyrrolidine and dihydrochloride monohydrate thereof*

Over a period of 10 minutes 99 g. (0.45 mole) of the pyrrolidine enamine of 2-pyrrolidinocyclohexanone is added to a stirred suspension of 99 g. of sodium borohydride in 1600 ml. of ethanol and the mixture is stirred overnight. The reaction mixture is evaporated in vacuo, and then 500 ml. each of water and ether are added and the mixture is stirred to form a solution. The ether layer is separated and then stirred with 750 ml. of 10% hydrochloric acid for 30 minutes. After separating the acid layer, it is cooled in ice and basified with 20% aqueous sodium hydroxide solution. The mixture is extracted with four 200-ml. portions of ether and the combined ether extract is washed with a saturated solution of sodium chloride, dried over magnesium sulfate and evaporated to give 97.4 g. of a yellow oil. Distillation at 0.1 mm. Hg pressure gives a first fraction, 7.4 g. of a crystalline substance, B.P. 90–100° C.; and 87 g. of a second fraction, cis-1,1'-(1,2-cyclohexylene)dipyrrolidine, B.P. 100–103° C. as a colorless oil.

*Analysis.*—Calcd. for $C_{14}H_{26}N_2$ (percent): C, 75.61; H, 11.79; N, 12.60. Found (percent): C, 75.37; H, 12.06; N, 12.53.

A solution of 85.5 g. of cis-1,1'-(1,2-cyclohexylene)-dipyrrolidine in 1500 ml. of ether is added to 600 ml. of 1.7 N ethereal hydrogen chloride, and the resulting solid is recrystallized from ethanol-ether to give 86 g. of cis-1,1' - (1,2 - cyclohexylene)dipyrrolidine dihydrochloride monohydrate, M.P. 259–260° C. (dec.).

*Analysis.*—Calcd. for $C_{14}H_{26}N_2 \cdot 2HCl \cdot H_2O$ (percent): C, 53.66; H, 9.65; Cl, 22.63; N, 8.94; $H_2O$, 5.75. Found (percent): C, 53.81; H, 9.81; Cl, 22.68; N, 9.40; $H_2O$, 5.88.

EXAMPLE 8

*Cis-1,1'-(1,2-cyclopentylene)dipyrrolidine and dihydrobromide hemihydrate thereof*

A mixture of 64 g. (0.31 mole) of the pyrrolidine enamine of 2-pyrrolidinocyclopentanone and 64 g. of sodium borohydride in 1750 ml. of ethanol is stirred overnight under a nitrogen atmosphere. The reaction mixture is then evaporated and the residue is stirred for 30 minutes with 500 ml. each of water and ether. The ether layer is separated and stirred for 1 hour with 300 ml. of 10% aqueous hydrochloric acid. The acid layer is separated, cooled in ice and basified with 15% aqueous sodium hydroxide solution. The mixture is extracted with methylene chloride, and the extract is washed with a saturated solution of sodium chloride, dried over magnesium sulfate and evaporated. Distillation through a 24" spinning band column gives 55.9 g. (87% yield) of cis-1,1'-(1,2-cyclopentylene)dipyrrolidine as an oil, B.P. 83° C. at 0.2 mm. Hg pressure.

*Analysis.*—Calcd. for $C_{13}H_{24}N_2$ (percent): C, 74.94; H, 11.61; N, 13.45. Found (percent): C, 75.01; H, 11.79; N, 13.56.

A solution of 54.9 g. (0.263 mole) of cis-1,1'-(1,2-cyclopentylene)dipyrrolidine in 500 ml. of ether is added to 152 g. (0.572 mole) of a 30% solution of hydrogen bromide in acetic acid dissolved in 500 ml. of ether. The solid that forms is separated from the mixture and recrystallized from methanol-ether to give 72.2 g. (73% yield) of cis-1,1-(cyclopentylene)dipyrrolidine dihydrobromide hemihydrate, M.P. 219–221° C. The melting point is unchanged upon recrystallization from methanol.

*Analysis.*—Calcd. for $C_{13}H_{24}N_2 \cdot 2HBr \cdot 0.5H_2O$ (percent): C, 41.17; H, 7.18; Br, 42.15; N, 7.39. Found (percent): C, 40.89; H, 7.24; Br, 42.75; N, 7.31.

EXAMPLE 9

*Cis-1-methyl-4-(2-piperidinocyclohexyl)piperazine and oxalate hemihydrate thereof*

A mixture of 0.1 mole of 2-(4-methylpiperazino)cyclohexanone, 24.8 g. (0.291 mole) of piperidine, 1.3 g. of p-toluenesulfonic acid, and 480 ml. of toluene is refluxed for 24 hours in an azeotropic separator. The mixture is then transferred to a Soxhlet extractor containing 200 g. of type 4A molecular sieve and refluxed for 24 hours. After evaporating the mixture, the residue is stirred with 800 ml. of ethanol and 36 g. of sodium borohydride for 24 hours. The mixture is evaporated to dryness and the residue is stirred with 150 ml. of water and 250 ml. of ether. The ether layer is separated from the mixture and stirred with 150 ml. of 10% aqueous hydrochloric acid. The acid layer is separated, cooled in ice, basified with 15% aqueous sodium hydroxide solution and then shaken with ether. The ether extract is washed with a saturated solution of sodium chloride, dried over magnesium sulfate and evaporated. The resulting oil (21.9 g.) is distilled through a 7" Vigreux column at 0.1 mm. Hg. pressure. Fraction 1 (9 g.), 2-(4-methyl-1-piperazinyl)cyclohexanol, boils at 110–115° C. Fraction 2 (3.4 g.), cis-1-methyl-4-(2-piperidinocyclohexyl)piperazine which boils at 130–145° C., is dissolved in 50 ml. of ether and then added to a solution of 3.46 g. of oxalic acid in 200 ml. of ether. The gummy solid that forms is washed by decantation with ether to give cis-1-methyl-4-(2-piperidinocyclohexyl)piperazine oxalate hemihydrate in the form of a hydroscopic colorless solid, M.P. 135–140° C. (efferv.).

*Analysis.*—Calcd. for $C_{16}H_{21}N_3 \cdot (C_2H_2O_4)_2 \cdot 0.5H_2O$ (percent): C, 52.84; H, 7.98; N, 9.25. Found (percent): C, 52.77; H, 8.14; N, 8.66.

EXAMPLE 10

*Cis-1,1'-(1,2-cyclopentylene)dipiperidine and dihydrobromide thereof*

Over a period of five minutes, 70 g. (0.3 mole) of the piperidine enamine of 2-piperidinocyclopentanone is added to a suspension consisting of 70 g. of sodium borohydride in 1120 ml. of ethanol and the mixture is stirred overnight at room temperature (about 25° C.). The mixture is then evaporated under reduced pressure, and the residue is stirred for 10 minutes with 500 ml. of water and 300 ml. of ether. The ether layer is separated and washed with water, then with a saturated solution of sodium chloride, dried over sodium sulfate and evaporated. The residue is distilled at 0.05 mm. Hg pressure to give 59.8 g. of cis-1,1'-(1,2-cyclopentylene)dipiperidine as an oil, B.P. 91–82° C.

*Analysis.*—Calcd. for $C_{15}H_{28}N_2$ (percent): C, 76.21; H, 11.94; N, 11.85. Found (percent): C, 76.61; H, 11.31; N, 12.07.

A solution of 56 g. of cis-1,1'-(1,2-cyclopentylene)dipiperidine in 550 ml. of ether is added to 127 g. of a 30% solution of hydrogen bromide in acetic acid dissolved in 1 liter of ether. The resulting gummy product is crystallized from ethanol to give 60 g. of cis-1,1'-(1,2-cyclopentylene)dipiperidine dihydrobromide, M.P. 252–253° C.

*Analysis.*—Calcd. for $C_{15}H_{28}N_2 \cdot 2HBr$ (percent): C, 45.24; H, 7.59; Br, 40.13; N, 7.04. Found (percent): C, 45.34; H, 7.73; Br, 39.32; N, 7.39.

EXAMPLE 11

*Cis-4-[2-(1-pyrrolidinyl)cyclohexyl]morpholine and salts thereof*

A mixture consisting of 34.8 g. (0.148 mole) of the pyrrolidine enamine of 2-morpholinocyclohexanone and a suspension of 34.8 g. of sodium borohydride in 560 ml. of ethanol is stirred overnight. It is then evaporated to dryness and the residue is mixed with 250 ml. of ether and 250 ml. of water. The aqueous layer is washed once with ether, and the combined ether layers are stirred with 250 ml. of 10% hydrochloric acid for 30 minutes. The acid layer is separated, basified with 20% aqueous sodium hydroxide solution and extracted with four 100-ml. portions of ether. The combined ether extract is washed with water, then with a saturated solution of sodium chloride, dried over magnesium sulfate and evaporated. Distillation, of the residue at a pressure of 0.2 mm. Hg through a 7" Vigreux column gives 21.7 g. (62% yield) of cis-4-[2-(1-pyrrolidinyl)cyclohexyl]morpholine as an oil, B.P. 107–108° C.

A solution of cis-4-[2-(1-pyrrolidinyl)cyclohexyl]-morpholine (21.1 g.) in 200 ml. of ether is added to 49 g. of a 30% solution of hydrogen bromide in acetic acid dissolved in 200 ml. of ether. The resulting oil is washed with ether by decantation and dissolved in methanol. The solution (about 150 ml.) when allowed to crystallize, yields 10.7 g. of cis-4-[2-(1-pyrrolidinyl)cyclohexyl] morpholine dihydrobromide methanol solvate, M.P. 245° C. and filtrate A.

*Analysis.*—Calcd. for $C_{14}H_{26}N_2O \cdot 2HBr \cdot CH_3OH$ (percent): C, 41.69; H, 7.44; Br, 36.98; N, 6.48. Found (percent): C, 40.96; H, 7.41; Br, 37.04; N, 6.49.

Filtrate A is treated with ether until crystallization occurs and the solution gives 14 g. of a product which upon recrystallization from methanol yields cis-4-[2-(1-pyrrolidinyl) - cyclohexyl]morpholine monohydrobromide methanol solvate, M.P. 229–236° C.

*Analysis.*—Calcd. for $C_{14}H_{26}N_2O \cdot HBr \cdot CH_3OH$ (percent): C, 51.28; H, 8.90; N, 7.98. Found (percent): C, 51.30; H, 8.68; N, 8.26.

EXAMPLE 12

*Cis-1-[2-(1-pyrrolidinyl)cyclohexyl]piperidine and dihydrobromide methanol solvate thereof*

The piperidine enamine of 2-pyrrolidinocyclohexanone (42 g.; 0.18 mole) is added during 5 minutes to a suspension of 42 g. of sodium borohydride in 710 ml. of ethanol and the mixture is stirred overnight. The reaction mixture is evaporated to dryness and 300 ml. water is added to the residue. The aqueous mixture is treated with four 150-ml. portions of ether. The combined ether extract is washed with 150 ml. of water and then stirred with 300 ml. of 10% hydrochloric acid for 30 minutes. After separating the acid layer, it is cooled in ice, basified with 20% aqueous sodium hydroxide solution and extracted with four 150-ml portions of ether. The combined ether extract is washed with a saturated solution of sodium chloride, dried over magnesium sulfate and evaporated. The resulting oil is distilled at a pressure of 0.3 mm. Hg through a 7″ Vigreux column to give 34 g. of cis-1-[2-(1-pyrrolidinyl)cyclohexyl]piperidine in the form of an oil, B.P. 109–110° C.

*Analysis.*—Calcd. for $C_{15}H_{28}N_2$ (percent): C, 76.21; H, 11.94; N, 11.85. Found (percent): C, 76.21; H, 12.10; N, 12.08.

A solution of 32.6 g. of cis-1-[2-(1-pyrrolidinyl)cyclohexyl]piperidine in 500 ml. of ether is added to 1 liter of an ethereal solution containing 80 g. of 30% hydrogen bromide in acetic acid. The resulting solid is recrystallized from methanol to give 39.7 g. of cis-1-[2-(1-pyrrolidinyl)cyclohexyl]piperidine dihydrobromide methanol solvate, M.P. 262° C. (efferv.).

*Analysis.*—Calcd. for $C_{15}H_{28}N_2 \cdot 2HBr \cdot MeOH$ (percent): C, 44.66; H, 7.97; Br, 37.15; N, 6.51. Found (percent): C, 44.30; H, 7.93, Br, 38.38; N, 6.75.

EXAMPLE 13

*Cis-1,1′-(1,4-cyclohexylene)dipiperidine and dihydrochloride hemihydrate thereof*

A solution of 14.6 g. of the piperidine enamine of 4-piperidinocyclohexanone in 50 ml. of absolute ethanol is added dropwise and with slight cooling to a stirred suspension of 14.6 g. of sodium borohydride in 150 ml. of absolute ethanol under nitrogen. The resulting mixture is stirred at room temperature (about 25° C.) overnight. The solvent is removed in vacuo and 250 ml. of water is added to the residue. After extracting the aqueous solution with three 100-ml. portions of ether, the combined ether extract is stirred with 150 ml. of 10% hydrochloric acid for 1 hour. The aqueous layer is separated from the mixture, made alkaline with 50% aqueous sodium hydroxide solution and then extracted with three 100-ml. portions of ether. The combined extract is dried over magnesium sulfate and the solvent is evaporated to leave 13.3 g. of cis-1,1′-(1,4-cyclohexylene)dipiperidine as a yellow oil, B.P. 112–125° C. at a pressure of 0.35–0.15 mm. Hg.

*Analysis.*—Calcd. for $C_{16}H_{30}N_2$ (percent): C, 76.74; H, 12.08; N, 11.19. Found (percent): C, 77.35; H, 12.36; N, 11.52.

Cis-1,1′-(1,4-cyclohexylene)dipiperidine (3.57 g.; 0.0143 mole) is dissolved in ether and 2 equivalents of ethereal hydrogen chloride are added. The hygroscopic precipitate is quickly filtered and washed with ether. The crude product is dissolved in methanol and then precipitated by the addition of ether. The product is filtered, washed with ether and vacuum-dried overnight to give 4.33 g. (94%) of cis-1,1′-(1,4 - cyclohexylene)dipiperidine dihydrochloride hemihydrate as a white solid, M.P. 322° C. (dec.) with sintering and darkening.

*Analysis.*—Calcd. for $C_{16}H_{30}N_2 \cdot 2HCl \cdot 0.5H_2O$ (percent): Cl, 21.33; N, 8.43. Found (percent): Cl, 21.41; N, 8.81.

EXAMPLE 14

*1,1′-(1,3-cyclohexylene)dipiperidine*

A solution of 24 g. of the piperidine enamine of 3-piperidinocyclohexanone in 100 ml. of absolute ethanol is added dropwise and with slight cooling to a stirred suspension of 24 g. of sodium borohydride in 150 ml. of absolute ethanol under nitrogen. The resulting mixture is stirred overnight at room temperature (about 25° C.). The solvent is removed in vacuo and 250 ml. of water is added to the residue. The aqueous solution is extracted with three 100-ml. portions of ether and the combined ether extract is stirred with 150 ml. of 10% hydrochloric acid for 1 hour. The aqueous layer is separated from the mixture, made alkaline with 50% aqueous sodium hydroxide solution and extracted with three 150-ml. portions of ether. The combined ether extract is dried over magnesium sulfate and the solvent is evaporated, leaving 18.2 g. of a yellow oil. Distillation of this oil under a high vacuum yielded 6 fractions. Fractions 5 and 6 gave 4.20 g. (17% yield) of a mixture of cis and trans-1,1′-(1,3-cyclohexylene)dipiperidine as a mixture of crystals and oil, B.P. 108–112° C. at 0.08 mm. Hg pressure.

EXAMPLE 15

*1,1′-(1,2-cycloheptylene)dipyrrolidine and fumarate thereof*

(A) 2-PYRROLIDINOCYCLOHEPTANONE

Pyrrolidine (56.9 g.; 0.8 mole) is stirred under a nitrogen atmosphere and heated to reflux. 2-chlorocycloheptanone (29.3 g.; 0.18 mole) is added dropwise at such a rate as to keep the temperature at 85–90° C. after removal of the heat source. Reflux is continued for three hours and the reaction mixture is allowed to stand overnight. Water (100 ml.) is added and the mixture is poured into a cold solution of 30 g. of sodium carbonate in 200 ml. water and allowed to stand. The solid that forms is separated from the mixture by filtration and the filtrate is extracted four times with ether. The extract is dried over anhydrous magnesium sulfate and concentrated to an oil. The oil is distilled under reduced pressure, the first three fractions being 2.65 g., B.P. 70–95° C. at 3.5–4.5 mm. Hg pressure; 9.17 g., B.P. 95–90° C. 4.5–5.0 mm. Hg pressure; and 2.20 g., B.P. 60–90° C. at 0.04 mm. Hg pressure. These fractions are combined, dissolved in ether and stirred with 10% aqueous hydrochloric acid for one hour. The aqueous layer is separated from the mixture, made alkaline with sodium hydroxide and extracted three times with ether. The extract is dried over anhydrous magnesium sulfate and after the solvent is evaporated the residue is distilled under reduced pressure to give 12.0 g. (37% yield) of 2-pyrrolidinocycloheptanone as a yellow oil, B.P. 78–81° C. at 0.07 mm. Hg pressure.

*Analysis.*—Calcd. for $C_{11}H_{19}NO$ (percent): C, 72.88; H, 10.57; N, 7.73. Found (percent): C, 72.36; H, 10.32; N, 7.85.

(B) 1,1′-(1,2-CYCLOHEPTYLENE)DIPYRROLIDINE

A mixture of 15.6 g. (0.086 mole) of 2-pyrrolidinocycloheptanone, 37.0 g. (0.52 mole) pyrrolidine, 0.3 g. p-toluenesulfonic acid and 150 ml. toluene is refluxed under nitrogen over a molecular sieve for three days. The solvent and excess pyrrolidine are removed in vacuo, giving 22 g. of a mixture of starting material and enamine as a dark brown oil. This oil is dissolved in 200 ml. of absolute ethanol and the resulting solution is added dropwise to a stirred suspension of 22 g. of sodium borohydride in 300 ml. of ethanol. The stirring is continued for 3 hours and the mixture is allowed to stand overnight. The ethanol is removed in vacuo and 300 ml. of water is added. The resulting suspension is extracted 3 times with ether and then the extract is stirred with 10% aqueous hydrochloric acid for one hour. After the layers are separated, the aqueous layer is made basic with sodium hydroxide and the resulting oil is extracted twice with ether. The extract is dried over magnesium sulfate and the ether is removed to give 17.7 g. of a dark yellow oil. The crude oil is distilled at 0.15 mm. Hg pressure to yield five fractions. Fractions 4 (4.90 g.; B.P. 82–87° C.) and 5 (3.78 g.; B.P. 87–90° C.), both of which contain predominantly a mixture of cis- and trans-1,1'-(1,2- cycloheptylene)dipyrrolidine, are combined and dissolved in ether, and passed through a column of 100 g. neutral alumina in ether. The eluate is concentrated to give 6.73 g. (33% yield) of a mixture of cis- and trans-1,1'-(1,2-cycloheptylene) dipyrrolidine in the form of a yellow oil.

*Analysis.*—Calcd. for $C_{15}H_{28}N_2$ (percent): C, 76.21; H, 11.94; N, 11.85. Found (percent): C, 76.67; H, 11.78; N, 11.78.

A solution containing 1.18 g. (0.05 mole) of the above cis- and trans-1,1'-(1,2-cycloheptylene)dipyrrolidine and 25 ml. of absolute ethanol is added to a solution of 1.16 g. (0.01 mole) of fumaric acid in 50 ml. of a 10% ethanol-ether mixture. A gummy solid separates and solidifies on standing. The product is filtered and washed with ether to give 1.90 g. of a white solid, M.P. 115–120° C. Recrystallization of this solid from 25 ml. of isopropyl alcohol yields 1.53 g. (85% yield) cis- and trans-1,1'-(1,2-cycloheptylene)dipyrrolidine fumarate in the form of white crystals, M.P. 120–130° C.

*Analysis.*—Calcd. for $C_{15}H_{28}N_2 \cdot C_4H_4O_4$ (percent): N, 7.95. Found (percent): N, 7.28.

EXAMPLE 16

*Trans - 1,1' - (1,4 - cyclohexylene)dipiperidine; and 1- (3 - cyclohexenyl - 1 - yl)piperidine and hydrochloride thereof*

A mixture of 15.3 g. (0.036 mole) of trans-1,4-di(tosyloxy)cyclohexane and 30 ml. of piperidine is stirred under nitrogen on a steam bath for 26 hours. The reaction mixture solidifies on cooling. Ether (100 ml.) and water (100 ml.) are added and the mixture is made basic with potassium hydroxide. The resulting aqueous and ether layers are separated and the aqueous layer is extracted with ether. All of the ether solutions are combined and stirred with 100 ml. of 10% aqueous hydrochloric acid. After separating the layers, the aqueous phase is made basic with potassium hydroxide. The oil that separates is taken up into ether and the ether extract is dried over magnesium sulfate and evaporated to give a mixture of oil and solid. This mixture is treated with acetone and the insoluble material, M.P. 127–130° C., is filtered and washed with acetone. Recrystallization from about 10 ml. of ethyl acetate gives 1.27 g. (15% yield) of trans-1,1'-(1,4-cyclohexylene)dipiperidine M.P. 129–131° C., in the form of colorless plates.

*Analysis.*—Calcd. for $C_{16}H_{30}N_2$ (percent): C, 76.74; H, 12.08; N, 11.19. Found (percent): C, 76.75; H, 11.97; N, 11.36.

The acetone filtrate (above) is concentrated to give a brown oily residue. This residue is distilled under reduced pressure to yield .65 g. (28% yield) of 1-(3-cyclohexen-1-yl)piperidine as a colorless oil, B.P. 109–110° C. at 13 mm. Hg pressure.

*Analysis.*—Calcd. for $C_{11}H_{19}N$ (percent): C, 79.94; H, 11.59; N, 8.48. Found (percent): C, 79.17; H, 11.40; N, 8.40.

1-(3-cyclohexen-1-yl)piperidine (1.60 g.) is dissolved in ether and treated with an equivalent amount of ethereal hydrogen chloride. The resulting solid is recovered by filtration, dissolved in methanol, and reprecipitated by the slow addition of ether to give 1.13 g. of 1-(3-cyclohexen-1-yl)piperidine hydrochloride as a white solid, M.P. 269–272° C. (dec.).

*Analysis.*—Calcd. for $C_{11}H_{19}N \cdot HCl$ (percent): C, 65.49; H, 9.99; Cl, 17.57; N, 6.94. Found (percent): C, 64.84; H, 9.78; Cl, 17.51; N, 7.27.

EXAMPLE 17

*Trans - 1,1' - (1,4 - cyclohexylene)dipyrrolidine; and 1- (3-cyclohexen - 1 - yl)pyrrolidine and hydrochloride thereof*

A mixture of 12.7 g. (0.03 mole) of trans-1,4-di(tosyloxy)cyclohexane and 30 ml. of pyrrolidine is stirred under nitrogen on a steam bath for 22 hours. The reaction mixture, which solidifies on cooling, is mixed with 100 ml. each of water and ether and this mixture is made basic with potassium hydroxide. The resulting aqueous and ether layers are separated and the aqueous layer is extracted with ether. Then all of the ether solutions are combined and stirred with 100 ml. of 10% aqueous hydrochloric acid. After separating the resulting layers, the aqueous phase is made basic with potassium hydroxide. The oil that separates is taken up into ether and the ether extract is dried over magnesium sulfate and evaporated to give a mixture of oil and solid. This mixture is treated with ethyl acetate and filtered to yield 0.30 g. of off-white plates, M.P. 95–97° C. Recrystallization of these plates from about 3 ml. of ethyl acetate gives 0.20 g. of trans-1,1' - (1,4 - cyclohexylene)dipyrrolidine in the form of a white solid, M.P. 95–97° C.

*Analysis.*—Calcd. for $C_{14}H_{26}N_2$ (percent): C, 75.61; H, 11.79; N, 12.60. Found (percent): C, 75.57; H, 11.48; N, 12.81.

The ethyl acetate filtrate is distilled under reduced pressure to yield .06 g. of 1-(3-cyclohexen-1-yl)pyrrolidine as a colorless oil, B.P. 90–92° C. at 13 mm. Hg pressure.

*Analysis.*—Calcd. for $C_{10}H_{17}N$ (percent): C. 79.40; H, 11.34; N, 9.26. Found (percent): C, 78.98; H, 11.36; N, 919.

1-(3-cyclohexen-1-yl)pyrrolidine is dissolved in ether and treated with an equivalent amount of ethereal hydrogen chloride. The resulting solid is filtered from the mixture, dissolved in methanol and reprecipitated by the slow addition of ether to give 1-(3-cyclohexen-1-yl)pyrrolidine hydrochloride, as a white solid, M.P. 195–200° C. (dec.).

*Analysis.*—Calcd. for $C_{10}H_{17}N \cdot HCl$ (percent): C, 63.99; H, 9.66; Cl, 18.89; N, 7.46. Found (percent): C, 63.53; H, 9.68; Cl, 18.80; N, 7.53.

EXAMPLE 18

*1,1'(1,4-cyclohexylene)dipyrrolidine (cis-trans mixture)*

(A) REDUCTION WITH SODIUM BOROHYDRIDE

A 250-ml. solution of 25 g. of the dipyrrolidine dienamine of 1,4-cyclohexanedione in ethanol is added to a suspension of 25 g. of sodium borohydride in 250 ml. of absolute ethanol with stirring and slight cooling over a period of 20 minutes under a nitrogen atmosphere. After stirring for several hours more, the mixture is allowed to stand overnight. The ethanol is removed under vacuum and the solid residue which turns reddish-brown on exposure to air is dissolved in 300 ml. of water and the solution is extracted with ether. The red extract is stirred with 10% aqueous hydrochloric acid and the resulting dark brown aqueous layer is separated from the mixture and made alkaline with 50% aqueous sodium hydroxide solution. The solution is extracted with three 100-ml. portions of ether and then the dark purple combined ether extract is dried over magnesium sulfate, concentrated to 100 ml. and passed over a column of 200 g. of neutral aluminum oxide, using ether as eluant. The first 400 ml. of eluate gives 14.4 g. of colorless crystals. Recrystallization from 30 ml. of ethyl acetate at −20° C. gives a first crop of 7.32 g. of white needles, M.P. 72–90° C. (sinters at 50° C.) and a second crop of 2.60 g. of off-white crystals, M.P. 48–90° C. Both of the crops are predominantly 1,1'-(1,4-cyclohexylene)dipyrrolidine.

*Analysis.*—Calcd. for $C_{14}H_{26}N_2$ (percent): C, 75.61; H, 11.79; N, 12.60. Found (percent): C, 75.60; H, 11.56; N, 12.77.

(B) CATALYTIC HYDROGENATION

Platinum oxide catalyst (1.0 g.) is added to 200 ml. of a solution of 20 g. of the pyrrolidine di-enamine of 1,4-cyclohexanedione in ethanol and the mixture is subjected to hydrogenation at an initial hydrogen pressure of 51 lbs. for 18 hours. All of the hydrogen uptake (about 72% of theory) occurs during the first 15 minutes. The catalyst is filtered and the solvent is evaporated to give 20.3 g. of a reddish-brown semicrystalline material. This material is dissolved in ether and passed through a column of neutral aluminum oxide to yield 16.5 g. of a mixture of solid and oil. Crystallization of this mixture from ethyl acetate at −20° C. gives a first crop of 11.0 g. of white crystals, M.P. 52–80° C. and a second crop of 2.46 g. of a tan solid, M.P. 50–90° C. Both crops are predominantly a mixture of the cis- and trans-isomers of 1,1'-(1,4-cyclohexylene)dipyrrolidine.

EXAMPLE 19

*Cis-1-methyl-1[2-(1-pyrrolidinyl)cyclohexyl]- pyrrolidinium iodide*

Methyl iodide (17.1 g.; 0.12 mole) is added to an ice-cooled solution of 0.03 mole of cis-1,1'-(1,2-cyclohexylene)dipyrrolidine in 100 ml. of methanol and the resulting solution is allowed to stand at room temperature (about 275° C.) overnight. Then the reaction mixture is evaporated and the residue is crystallized from an ethyl acetate-methanol solution to give 7 g. of crude cis-1-methyl - 1 - [2 - (1 - pyrrolidinyl)cyclohexyl]pyrrolidinium iodide, M.P. 168–170° C. Upon recrystallization from the same solvent mixture the melting point is 164–166° C.

*Analysis.*—Calcd. for $C_{15}H_{29}IN_2$ (percent): C, 49.45; H, 8.02; N, 7.69. Found (percent): C, 49.81; H, 8.11; N, 7.78.

EXAMPLE 20

*4-tosyloxycyclohexanol and 1,4-di(tosyloxy)cyclohexane*

A solution of 190.7 g. (1.0 mole) of p-toluenesulfonyl chloride in 300 ml. of pyridine is added dropwise to a stirred solution of 116.2 g. (1.0 mole) of 1,4-cyclohexanediol in 350 ml. of pyridine, keeping the temperature below 20° C. After stirring the reaction mixture for an hour, it is allowed to stand overnight. Then the mixture is poured into about 8 liters of ice-water containing 650 ml. of concentrated hydrochloric acid. A gum separates and it is extracted with three 1-liter portions of chloroform. The combined ether extracts are washed with water, then with a saturated solution of sodium chloride, and dried over anhydrous sodium sulfate. The solvent is removed by evaporation to give 232 g. of a dark yellow oil comprising a mixture of 4-tosyloxycyclohexanol and 1,4-di(tosyloxy)cyclohexane.

If desired, the 1,4-di(tosyloxy)cyclohexane is readily separated from 4-tosyloxycyclohexanol by column chromatography on silica gel using 10% and 20% ethyl-methylene chloride solutions as the eluant.

EXAMPLE 21

*4-tosyloxycyclohexanone and 1,4-di(tosyloxy)cyclohexane*

A solution of 232 g. of a mixture of 4-tosyloxycyclohexanol and 1,4-di(tosyloxy)cyclohexane (Example 20) in 225 ml. of acetone and 450 ml. of glacial acetic acid is cooled to 10° C. To this solution a solution of 125 g. (1.25 moles) of chromium trioxide in 100 ml. of water and 200 ml. of glacial acetic acid is added dropwise with stirring over a period of 1.5 hours, keeping the temperature below 15° C. After stirring for an additional 2 hours the mixture is poured into 5 liters of ether and 1 liter of water and thoroughly mixed. The ether layer is separated from the mixture and washed with three 1-liter portions of water. The ether layer is separated and combined with 2 liters of water and the mixture is neutralized by the slow addition of 300 g. of solid sodium bicarbonate with vigorous stirring. Methylene chloride (about 700 ml.) is added to prevent the product from precipitating. The layers are separated and the organic layer is washed with a saturated solution of sodium chloride, and dried over sodium sulfate followed by magnesium sulfate. The drying agents are filtered and washed with methylene chloride. The combined filtrate and washing is concentrated in vacuo to give 222 g. of a crystalline mixture of 4-tosyloxycyclohexanone and 1,4-di(tosyloxy)cyclohexane.

(A) CHROMATOGRAPHIC SEPARATION OF THE KETONE AND DITOSYLATE

A 40.8 g. of sample of the mixture of 4-tosyloxycyclohexanone and 1,4-di(tosyloxy) cyclohexane is chromatographed on 2 kg. of silica gel, using a 10% ether-methylene chloride solution as the eluant, and collecting the following fractions: fractions 1–3 (1200 ml. total); fractions 4–6 (1000 ml. total); fractions 7–10 (800 ml. total); and fractions 11–18 (3600 ml. total). Fractions 4 to 6 contain 8.85 g. of 1,4-di(tosyloxy)cyclohexane and fractions 11 to 18 contain 36.1 g. of 4-tosyloxycyclohexanone.

*Analysis (mixture of isomers).*— Calcd. for $C_{20}H_{24}O_6S_2$ (percent): C, 56.58; H, 5.70; S, 15.10. Found (percent): C, 56.36; H, 5.67; S, 15.15.

Fractional crystallization of the product from ether-Skellysolve B hexanes of fractions 4 to 6 gives the less soluble trans-1,4-di(tosyloxy)cyclohexane, M.P. 155–158° C., in the first crop, and the more soluble cis-1,4-di(tosyloxy)cyclohexane, M.P. 95–98° C., in the third crop.

Crystallization of the product of fractions 11 to 18 from ether-Skellysolve B hexanes gives 28.5 g. of 4-tosyloxycyclohexanone, M.P. 95–98° C., in the form of white needles.

*Analysis.*—Calcd. for $C_{13}H_{16}O_4S$ (percent): C, 58.19; H, 6.01; S, 11.95. Found (percent): C, 58.09; H, 6.16; S, 11.70.

I claim:

1. A compound selected from the class consisting of
   (A) compounds having the formulae:

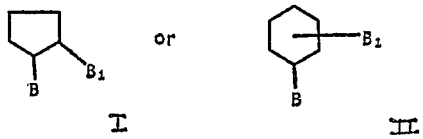

wherein B and $B_1$ are either piperidino, morpholino, piperazino, pyrrolidino, or alkylpiperazino wherein alkyl contains from one to 4 carbon atoms;
   (B) the acid addition salts of said compounds with pharmacologically acceptable acids; and
   (C) said acid addition salts which are solvated with water or methanol.

2. A compound of claim 1 wherein B and $B_1$ are piperidino.

3. A compound of claim 1 wherein B and $B_1$ are either morpholino, piperazino, pyrrolidino, or 4-methylpiperazino.

4. A compound of claim 2 having the formula of I.

5. The dihydrobromide of the compound of claim 4.

6. A compound of claim 2 having the formula of II, wherein B and $B_1$ are in the cis-1,2 positions.

7. The dihydrobromide methanol solvate of the compound of claim 6.

8. A compound of claim 2 having the formula of II, wherein B and $B_1$ are in the trans-1,2 positions.

9. The dihydrobromide methanol solvate of the compound of claim 8.

10. A compound of claim 2 having the formula of II, wherein B and $B_1$ are in the 1,3-positions.

11. A compound of claim 2 having the formula of II, wherein B and $B_1$ are in the cis-1,4 positions.

12. The dihydrochloride hemihydrate of the compound of claim 11.

13. A compound of claim 2 having the formula of II, wherein B and $B_1$ are in the trans-1,4 positions.

14. A compound of claim 3 wherein B and $B_1$ are pyrrolidino.

15. A compound of claim 14 having the formula of I.

16. The dihydrobromide hemihydrate of the compound of claim 15.

17. A compound of claim 14 having the formula of II, wherein B and $B_1$ are in the cis-1,2 positions.

18. The dihydrochloride monohydrate of the compound of claim 17.

19. A compound of claim 14 having the formula of II, wherein B and $B_1$ are in the trans-1,2 positions.

20. The dihydrochloride hemihydrate of the compound of claim 19.

21. A compound of claim 14 having the formula of II, wherein B and $B_1$ are in the cis-1,4 positions.

22. A compound of claim 14 having the formula of II, wherein B and $B_1$ are in the trans-1,4 positions.

23. A compound of claim 1 having the formula of II, wherein B is piperidino and $B_1$ is pyrrolidino, and B and $B_1$ are in the cis-1,2 positions.

24. The dihydrobromide methanol solvate of the compound of claim 23.

25. A compound of claim 1 having the formula of II, wherein B is piperidino and $B_1$ is pyrrolidino, and B and $B_1$ are in the trans-1,2 positions.

26. The dihydrochloride methanol solvate hemihydrate of the compound of claim 25.

27. A compound of claim 1 having the formula of II, wherein B is piperidino and $B_1$ is 4-methylpiperazino, and B and $B_1$ are in the cis-1,2 positions.

28. The oxalate (1:2) hemihydrate of the compound of claim 27.

29. A compound of claim 3 having the formula of II, wherein B is pyrrolidino and $B_1$ is morpholino, and B and $B_1$ are in the cis-1,2 positions.

30. The monohydrobromide methanol solvate of the compound of claim 29.

31. The dihydrobromide methanol solvate of the compound of claim 29.

32. A compound of claim 3 having the formula of II, wherein B is pyrrolidino and $B_1$ is morpholino, and B and $B_1$ are in the trans-1,2 positions.

33. The dihydrochloride methanol solvate of the compound of claim 32.

References Cited
UNITED STATES PATENTS 3,036,020   5/1962   Britain _____ 260—2.5

HENRY R. JILES, Primary Examiner

G. T. TODD, Assistant Examiner

U.S. Cl. X.R.

260—239 B, 243 B, 244 R, 246 B, 268, H, 291, 293.63, 293.69, 293.71, 326.85, 456 P; 424—244, 246, 248, 250, 267, 274

UNITED STATES PATENT OFFICE
CERTIFICATE OF CORRECTION

Case 2443

Patent No. 3,652,559      Dated  March 28, 1972

Inventor(s)  Jacob Szmuszkovicz

It is certified that error appears in the above-identified patent and that said Letters Patent are hereby corrected as shown below:

Column 2, line 53, for "cycalkene" read -- cycloalkene --. Column 3, line 12, for "amine reflux" read -- amine under reflux Column 4, line 61, for "  " read -- 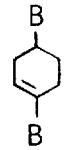 --. Column 8, line for "(36.7 g." read -- (36.7 g.) --. Column 9, line 67, for "pipiredine" read -- piperidine --. Column 10, line 23, for "2H read -- 2HBr --. Column 12, line 20, for "91-82° C." read -- 91-92° C. --. Column 15, line 60, for ".65 g." read -- 1.65 Column 16, line 29, for ".06 g." read -- 1.06 g. --. Column 16, line 33, for "919" read -- 9.19 --. Column 17, line 27, for "275° C." read -- 25° C. --.

Signed and sealed this 9th day of January 1973.

(SEAL)
Attest:

EDWARD M. FLETCHER, JR.      ROBERT GOTTSCHALK
Attesting Officer              Commissioner of Patents